United States Patent [19]
Holt, Jr.

[11] Patent Number: 5,713,308
[45] Date of Patent: Feb. 3, 1998

[54] GIRTH TIGHTENING ANIMAL HARNESS

[75] Inventor: Robert C. Holt, Jr., North Canton, Ohio

[73] Assignee: Coastal Pet Prducts, Inc., Alliance, Ohio

[21] Appl. No.: 555,214

[22] Filed: Nov. 8, 1995

[51] Int. Cl.$^6$ ............................................. A01K 27/00
[52] U.S. Cl. ........................ 119/856; 119/792; 119/907
[58] Field of Search ................................. 119/856, 792, 119/858, 702, 907

[56] References Cited

U.S. PATENT DOCUMENTS

| | | | |
|---|---|---|---|
| 1,685,435 | 9/1928 | Philbrick | 119/856 |
| 4,964,369 | 10/1990 | Sporn | 119/96 |
| 5,325,819 | 7/1994 | Krauss | 119/792 |
| 5,329,885 | 7/1994 | Sporn | 119/856 |
| 5,335,627 | 8/1994 | Bandimere | 119/864 |
| 5,359,964 | 11/1994 | Sporn | 119/864 |
| 5,370,083 | 12/1994 | Sporn | 119/864 |
| 5,383,426 | 1/1995 | Krauss | 119/793 |
| 5,471,953 | 12/1995 | Sporn | 119/792 |
| 5,503,113 | 4/1996 | Knight | 119/856 |
| 5,511,515 | 4/1996 | Brown et al. | 119/792 |

FOREIGN PATENT DOCUMENTS

| | | | |
|---|---|---|---|
| 2 201 874 | 9/1988 | United Kingdom | |
| 9202128 | 2/1992 | WIPO | 119/792 |

OTHER PUBLICATIONS

Colly Keller Martigny SA—Advertisement for Collier en cuir and Lederhalsband, 2 pages, (May 1994).
The Company of Animals, Ltd.—Advertisement "Pets have problems . . .", 2 pages (undated).
Dog Crazy—Advertisement "K–9 Control™", 2 pages (undated).
EA Young Co., Ltd.—Advertisement "We are Specialized in Pets", 2 pages, (undated).
Four Paws Products Ltd.—Advertisement "The Home of Quality Pet Products", 2 pages (undated).
Golden Pet Products—Advertisement "Buy from Expert–Save Your Money–Save Your Time", 2 pages (undated).
Mustang Products, Inc.—Advertisement "The K–9 Kumalong™", 3 pages (1988).
Pet–Acc's Joachim Merkert—Advertisement ">>. . . just noch 'reingekommen!<<", 3 pages (1991).
Pet–Acc's Joachim Merkert—Advertisement "Sinnvolles für Hund und Katze", 4 pages (1991).
Premier Pet Products, Inc.—Advertisement "Collars, Leashes & Stuff like that . . . ", 6 pages (Mar 1994).
Scott's Dog Supply—Advertisement "Specializing in Hunting and Training Equipment for Sporting dogs", 4 pages (1989).
Thane Marketing International—Advertisement "Ttouch Canine Halter™", 4 pages (1995).

*Primary Examiner*—John G. Weiss
*Assistant Examiner*—Bruce E. Snow
*Attorney, Agent, or Firm*—Renner, Kenner, Greive, Bobak, Taylor & Weber

[57] ABSTRACT

An animal restraint and control harness (10) for use in conjunction with a leash (11) has a cord portion (15), a plurality of adjustment slides (16), a control slide (18), and a leash attachment eyelet (19). The cord portion (15) is threaded through the adjustment slides (16) and the control slide (18), as well as through the leash attachment eyelet (19), to form a plurality of loop portions (36) and a plurality of bridge portions (38). A first loop portion (36a) is adapted to fit around the neck of an animal, and a second loop portion (36b) is adapted to be fitted around the chest of an animal. A third loop portion (36c) is connected to the leash (11) by the leash attachment eyelet (19) and communicates with the second loop portion (36b) by way of the control slide (18) such that when the animal strains against the leash (11), the cord (15) is slidably translated in the control slide (18) so as to increase the size of the third loop portion (36c) and to decrease the size of the second loop portion (36b). The second loop portion (36b) cinches around the animal's chest, causing the animal to cease the straining behavior to relieve the cinching discomfort.

1 Claim, 3 Drawing Sheets

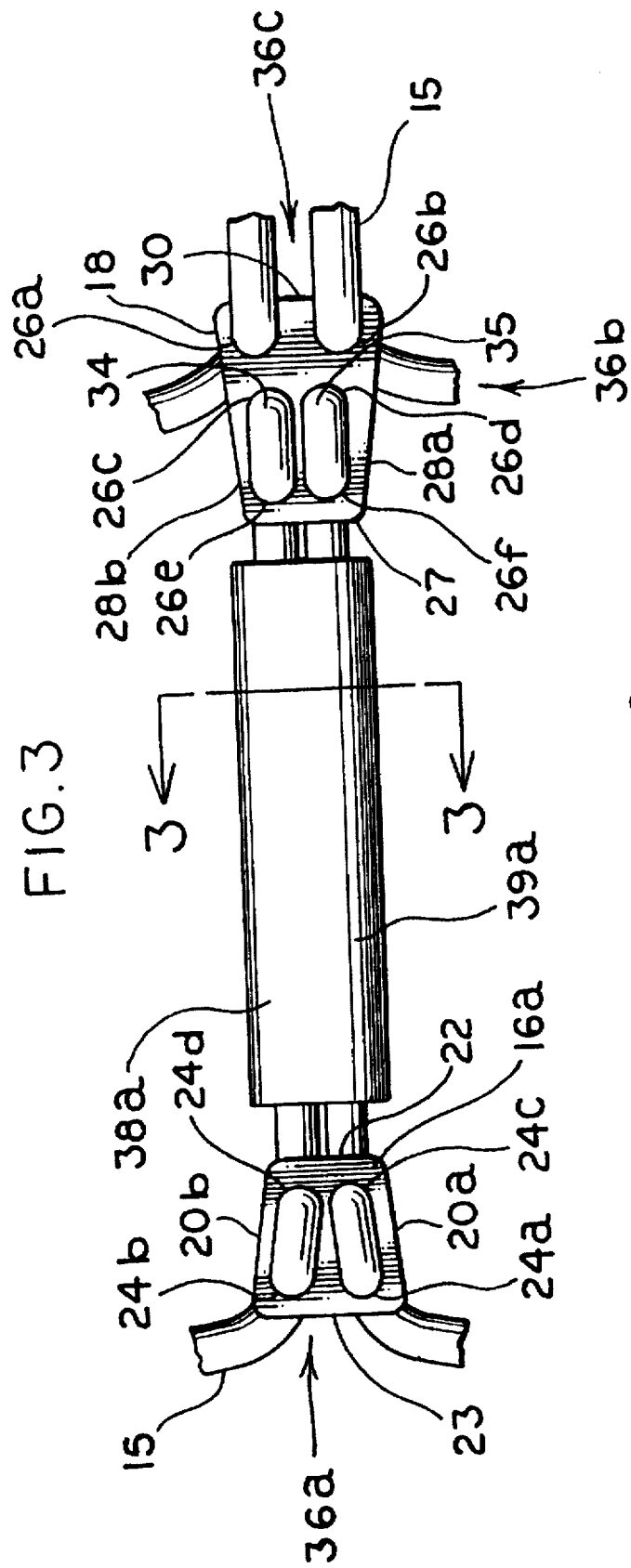
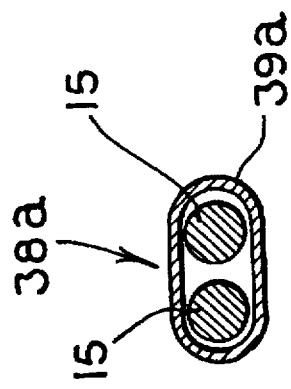

GIRTH TIGHTENING ANIMAL HARNESS

TECHNICAL FIELD

This invention relates to animal harnesses, for example, of the type used for domestic pets in conjunction with a leash. More particularly, this invention relates to a girth tightening harness which, when a strain is brought upon the leash due to pulling by the animal, tightens around the animal's girth, causing the animal to cease the pulling behavior to relieve the tightness.

BACKGROUND ART

For many years, it has been known to use harnesses on domestic pets, such as cats or dogs, for the purpose of restraining or controlling the animal. Such harnesses include simple neck collars, and also more elaborate body harnesses which are typically fitted around the animal's chest as well as around the neck.

More recently, it has been known to use harnesses and collars which function in response to undesirable behavior by the animal so as to discourage such behavior. For example, one such undesirable behavior is that of pulling or tugging by the animal, when the animal is restrained on a leash. Many dog owners find such behavior to be particularly problematic when walking dogs, especially of larger breeds. Attempts to discourage such behavior have included simple choke collars which tighten around the animal's neck when the animal strains against the leash. Other, more recent attempts have included the use of harnesses which tighten under the foreleg pits of the animal when the animal initiates a strain on the leash or tie out. Examples of such harnesses are found in U.S. Pat. Nos. 4,964,369; 5,329,885; 5,359,964; and 5,370,083, all to Sporn, as well as U.S. Pat. No. 5,325,819 to Krauss which disclose harnesses which, when the animal strains against the leash, tighten upwardly and rearwardly under the animal's forelegs. U.S. Pat. No. 5,335,627 to Bandimere discloses a harness which tightens under the animal's foreleg pits by pulling upwardly when the animal strains against the leash. While these designs have proven effective in accomplishing the objective of discouraging pulling or tugging, it has been recognized that the cinching of the harness under the foreleg pits is often painful to the animal. Although a level of discomfort must necessarily be present when the animal strains against the leash in order to have the desired effect, it is believed that the effect can be accomplished while providing a higher level of comfort for the animal.

DISCLOSURE OF THE INVENTION

It is thus a primary object of the present invention to provide a harness for restraining an animal in conjunction with a leash.

It is another object of the present invention to provide a harness, as above, which is effective to discourage pulling or tugging by the animal.

It is a further object of the present invention to provide a harness, as above, which provides a higher level of comfort for the animal than previously known devices.

It is yet another object of the present invention to provide a harness, as above, which is adjustable and easily fitted on the animal.

It is a still further object of the present invention to provide a harness, as above, which is easy and inexpensive to manufacture using known manufacturing techniques.

These and other objects of the present invention, which will become apparent from the description to follow, are accomplished by the improvements hereinafter described and claimed.

In general, an animal restraint and control device includes a harness member adapted to fit on the body of an animal and to connect to a leash for restraining the animal. Means for cinching the harness around the animal's body, when the animal strains against the leash, is also provided so that the cinching of the harness stimulates the animal to responsively cease straining against the leash in order to relieve the discomfort caused by the cinching.

More specifically, the harness member is formed into a plurality of loop portions and a plurality of bridge portions. A plurality of adjustment slides engage the harness member, as does a control slide and a leash attachment member. A first loop portion is defined between the first adjustment slide and the second adjustment slide and is adapted to be fitted around the neck of the animal. A second loop portion is defined between the third adjustment slide and the control slide and is adapted to be fitted around the chest of an animal. A first bridge portion is defined between the first adjustment slide and the control slide, while a second bridge portion is defined between the second adjustment slide and the third adjustment slide. First and second sleeve members are provided to surround the first and second bridge portions, respectively, to prevent the formation of loops therein. The first loop portion is in slidable communication with the control slide so that when the leash is strained against, the harness member slides through the control slide so as to tighten the second loop portion around the animal's chest.

A preferred exemplary device incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 2 is an enlarged, fragmented plan view showing a portion of the harness according to the concept of the present invention.

FIG. 3 is a sectional view taken substantially along the line 3—3 of FIG. 2.

PREFERRED EMBODIMENT FOR CARRYING OUT THE INVENTION

Figure 1:
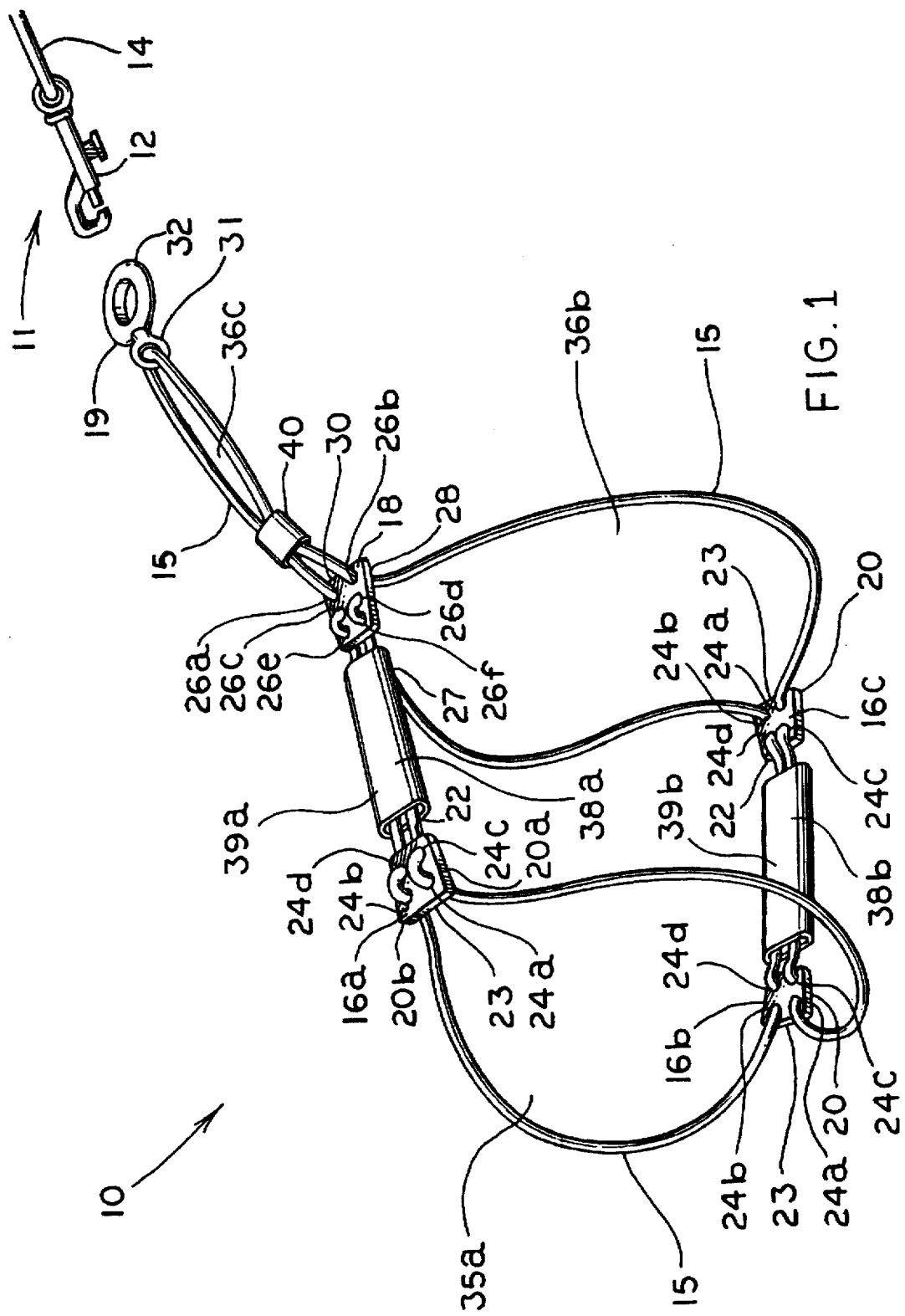
FIG. 1 is a perspective view of a harness according to the concepts of the present invention.
Figure 4:
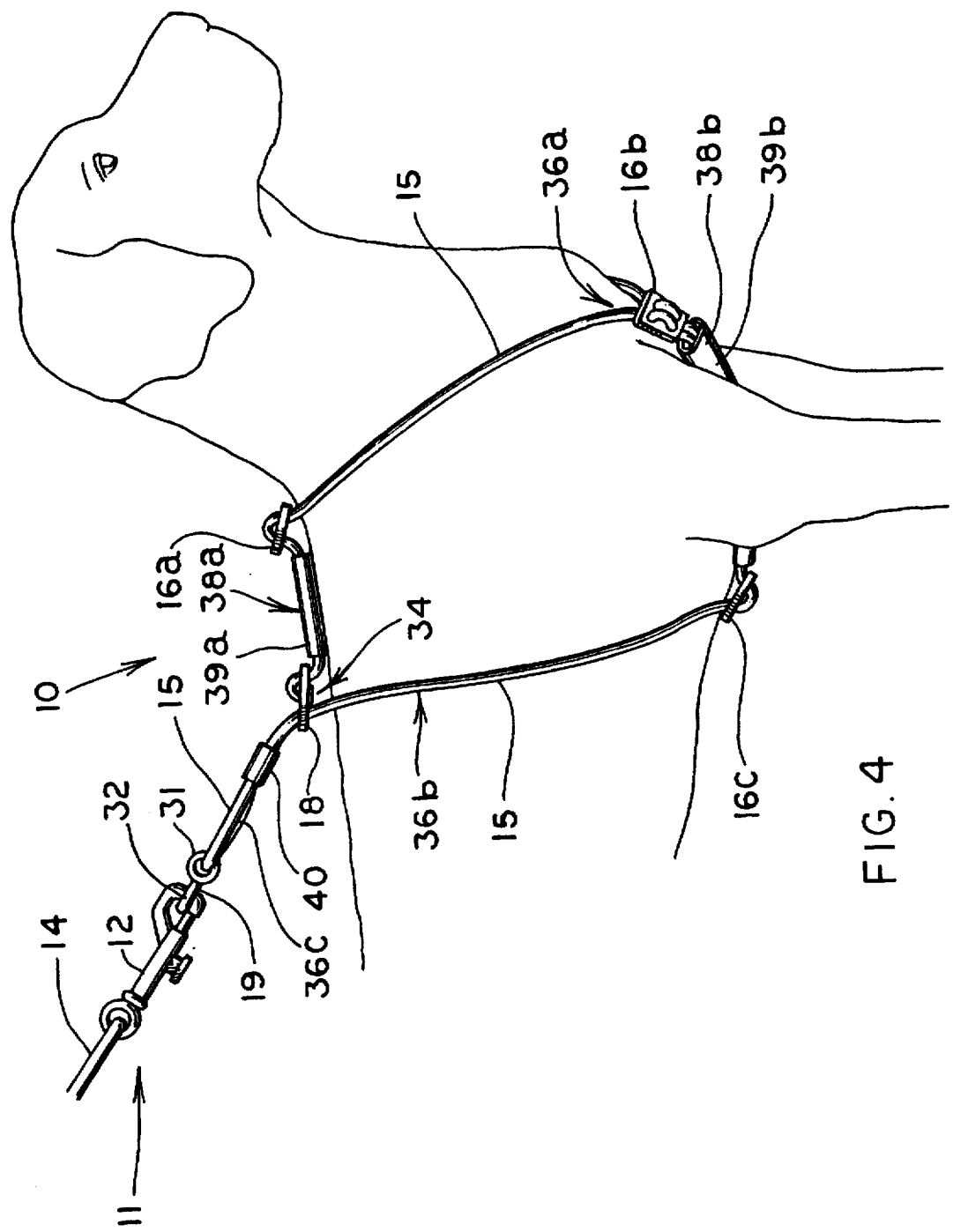
FIG. 4 is a perspective view of a harness according to the concept of the present invention fitted on a dog and being engaged by a leash.

An animal harness, generally indicated by the numeral 10 in the drawings, is designed for use in conjunction with a leash 11. The leash 11 includes a snap 12 which is affixed to a lead 14.

Harness 10 generally includes a cord portion 15, a plurality of adjustment slides 16, a control slide 18, and a leash attachment eyelet 19. The cord portion 15 of the harness 10 may be a continuous length of cord or rope or may be in the form of a strap. Similarly, the cord, rope or strap may be fabricated from any number of appropriate materials, such as a braid material or flat woven Nylon.

The adjustment slides 16 are preferably made of a thin, flat, cast metal or other appropriate material. Each adjustment slide 16 is of a generally tapered shape defined by opposed tapered edges 20 which taper from a first edge 22 to a substantially longer second edge 23. As shown, each adjustment slide 16 includes a plurality of apertures 24 therein. Apertures 24 are oriented in spaced relationship with one another, such that a first pair of apertures 24a and 24b are located proximal to the second edge 23 of slides 16. Similarly, a second pair of apertures 24c and 24d are located proximal to the first edge 22 of slides 16. For reasons which will become apparent as the description continues, apertures 24a and 24b are angularly offset from apertures 24c and 24d at an angle approximating that of the tapered edges 20 of the slides 16.

The control slide 18 is similar to the adjustment slides 16 in that it can be made of the same material and is of approximately the same thickness, although it is preferably slightly longer. Further, control slide 18 includes three pairs of angularly offset apertures 26. A first pair of apertures 26a and 26b are angularly offset from a second pair of apertures 26c and 26d proximal to a first edge 30 at an angle approximating that of the tapered edges 28. Control slide 18 differs from adjustment slides 16 in that the apertures 26a and 26b are approximately ⅓ larger in diameter than the apertures 26c and 26d. An additional pair of apertures 26e and 26f are located adjacent to the apertures 26c and 26d, proximal to the second edge 27.

Leash attachment eyelet 19 is also preferably made from a material similar to that used for the slides 16 and 18. In the preferred embodiment, eyelet 19 includes a harness ring portion 31 and a leash ring portion 32. As shown, harness ring portion 31 is disposed generally perpendicularly to leash ring portion 32. Those skilled in the art will recognize that eyelet 19 could take many different shapes or designs and still accomplish the objects of the invention. For example, it is contemplated that the leash attachment eyelet 19 could be in the form of a single ring or a swivel.

The harness 10 may be assembled with the first end 34 of cord portion 15 being threaded through aperture 26c of control slide 18. End 34 of cord 15 is then secured to control slide 18 by melting, stitching or knotting end 34 so that it may not pass back through aperture 26c. The second end 35 of cord 15 is then threaded through aperture 26e directly adjacent to aperture 26c in the manner shown. Cord 15 is then similarly threaded through apertures 24b and 24d of each of adjustment slides 16. Once cord 15 has been threaded through apertures 24b and 24d of each of the adjustment slides 16, cord 15 is then passed through aperture 26a of control slide 18, through the harness ring portion 31 of eyelet 19, and back through the control slide 18 at the aperture 26b. Cord 15 is then threaded back through the remaining apertures 24a and 24c of each of the adjustment slides 16. The second end 35 of cord 15 is finally threaded through apertures 26d and 26f, which remain in the control slide 18, and secured thereto in a manner similar to that used for first end 34. Those having skill in the art will recognize that for efficiency and simplicity the harness may be assembled in numerous different ways and that the assembly steps set forth hereinabove are used merely for clarity of description. for example, it may be preferred to insert the cord 15 into the attachment eyelet 19 and thread both ends 34 and 35 through the slide apertures simultaneously. Accordingly, the cord 15 cooperates with the slides 16 and 18 to form a symmetrical harness member 10.

With cord 15 threaded and secured to slides 16 and 18, harness 10 defines a plurality of loop portions 36 and a plurality of bridge portions 38. Specifically, a first loop portion 36a is defined by the portion of cord 15 located between the adjustment slides 16a and 16b. Similarly, a second loop portion 36b is defined by the portions of cord 15 located between adjustment slide 16c and control slide 18. A third loop portion 36c is defined by the cord portion extending from control slide 18 to attachment eyelet 19. A first bridge portion 38a is defined by the portions of the cord 15 located between control slide 18 and adjustment slide 16a, and serves to connect the first loop portion 36a with the second loop portion 36b. Likewise, a second bridge portion 38b is defined by the portions of the cord 15 located between adjustment slides 16b and 16c, thus further serving to connect first loop portion 36a with second loop portion 36b.

It is contemplated that the portions of the cord 15 forming bridge portions 38 may be secured together so as to maintain the cord 15 in a substantially closed state, thereby preventing the formation of a loop in the vicinity of bridge portions 38. Accordingly, sleeves 39, preferably formed from a length of tubular material, such as braided Nylon or vinyl, may be fitted over cord 15 during the assembly process. Alternatively, the cords may be fastened together using a clasp, stitch, heat seal or other appropriate means.

In operation, the size of loops 36 may be adjusted by appropriately positioning slides 16b and 16c relative to cord 15. Loops 36a and 36b are expanded and harness 10 fitted on the animal such that first loop 36a is disposed around the animal's neck, while second loop 36b is disposed around the animal's chest just behind the animal's forelegs. As such, first bridge portion 38a lies in the middle of the animal's back directly over the animal's shoulders, while second bridge portion 38b lies on the animal's chest substantially between the forelegs. Once the harness is fitted on the animal's body, the harness may be further adjusted so as to establish a secure and comfortable fit. At this point, it should be apparent that the sizes of loop portions 36b and 36c are directly dependent upon one another. That is, cord 15 passes through control slide 18 such that if loop portion 36b is expanded, loop portion 36c will be contracted and vice versa. It should also be recognized that the tapered profiles of slides 16 and 18 help to maintain loops 36a and 36b in a substantially open state when second edges 23 and 30, respectively, are disposed toward loops 36. Likewise, the orientation of slides 16 and 18 is such that the first edges 22 and 27 are disposed toward bridge portions 38, which serves to maintain cord 15 in a substantially closed position. With loops 36a and 36b in a substantially open state, and bridges 38a and 38b being maintained in a substantially closed position, the fitting of harness 10 on the animal is facilitated. The closed positions of bridges 38 and sleeves 39 or other fastening means cooperate to prevent the possibility that harness 10 will be improperly fitted. Sleeves 39 also serve to reduce snagging and tangling of harness 10 while in use.

It may be desirable to provide a keeper slide 40 to be fitted around the third loop portion 36c so as to prevent the cord portions forming the loop 36c from sliding through the control slide under slack. Keeper slide 40 is preferably a length of vinyl tube or molded plastic piece having an inside diameter just large enough to snugly receive the adjacent cord portions.

In use, harness 10 is affixed to leash 11 by securing snap 12 to leash attachment eyelet 19. It should thus be apparent that, as the animal strains against leash 11, loop portion 36c will expand as the cord is pulled through control slide 18, causing loop portion 36b to contract. The contracting of loop portion 36b around the animal's chest causes a cinching or tightening action which is less comfortable to the animal. Accordingly, the animal acts in a manner to relieve the discomfort by ceasing to strain against leash 11. With the animal's comfort directly linked to the animal's behavior, a stimulus/response mechanism is established to discourage the undesirable pulling behavior. Not only does the harness discourage the unwanted behavior, but also does so in a manner which is much more comfortable to the animal than was previously known in the art.

The above-described invention thus accomplishes the objects of the present invention and otherwise improves the art.

I claim:

1. An animal restraint device for use in conjunction with a leash, comprising:

a harness member being formed from a single length of unbroken material that is configured into a plurality of loop portions and a plurality of bridge portions;

first, second and third adjustment slides engaging said harness member; said plurality of adjustment slides each being tapered and including a first pair of spaced apertures and a second pair of spaced apertures angularly spaced from said first pair of spaced apertures, said apertures being adapted to engage the harness such that said second pair of spaced apertures aids in maintaining said loop portions;

a control slide also engaging said harness member; said control slide being tapered and including three pairs of spaced apertures, at least one pair of said spaced apertures being larger and angularly offset from at least one other pair of spaced apertures, said apertures adapted to engage the harness and said at least one pair of angularly offset apertures adapted to aid in maintaining one of said loop portions;

a leash attachment member affixed to said harness member and adapted to be attached to a leash;

a first said loop portion being defined between said first and second adjustment slides and adapted to be fitted around the neck of an animal;

a second said loop portion being defined between said third adjustment slide and said control slide and adapted to be fitted around the chest of an animal;

a first said bridge portion defined between said first adjustment slide and said control slide;

a second said bridge portion defined between said second adjustment slide and said third adjustment slide;

a third said loop portion defined between said control slide and said leash attachment member;

a first fastening means engaging said first bridge portion so as to prevent the formation of a loop at said first bridge portion;

a second fastening means engaging said second bridge portion to prevent the formation of a loop at said second bridge portion; and said second loop portion slidably communicating with said third loop portion through said control slide so that when the leash is strained against, said harness member slides through said control slide, increasing the size of said third loop portion and causing the size of said second loop portion to decrease so as to tighten around the animal's chest.

* * * * *